(12) United States Patent
Conway (10) Patent No.: US 10,665,051 B2
(45) Date of Patent: May 26, 2020

(54) BULK FOOD INTEGRATED SCALE SYSTEM

(71) Applicant: Smartbins, Inc., Capitola, CA (US)

(72) Inventor: David Conway, Vallejo, CA (US)

(73) Assignee: SmartBins Inc., Capitola, CA (US)

(*) Notice: Subject to any disclaimer, the term of this patent is extended or adjusted under 35 U.S.C. 154(b) by 208 days.

(21) Appl. No.: 15/423,197

(22) Filed: Feb. 2, 2017

(65) Prior Publication Data

US 2018/0218562 A1    Aug. 2, 2018

(51) Int. Cl.

| | | |
|---|---|---|
| G07F 11/44 | (2006.01) | |
| A47F 1/035 | (2006.01) | |
| G07F 9/02 | (2006.01) | |
| G07G 5/00 | (2006.01) | |
| G06Q 20/14 | (2012.01) | |
| G01G 19/414 | (2006.01) | |
| G06Q 20/20 | (2012.01) | |
| A47B 51/00 | (2006.01) | |

(52) U.S. Cl.
CPC ............. G07F 11/44 (2013.01); A47F 1/035 (2013.01); G01G 19/4144 (2013.01); G06Q 20/145 (2013.01); G06Q 20/209 (2013.01); G07F 9/023 (2013.01); G07G 5/00 (2013.01); *A47B 51/00* (2013.01)

(58) Field of Classification Search
CPC ............. G07F 11/44; A47F 1/03; A47F 1/035
See application file for complete search history.

(56) References Cited

U.S. PATENT DOCUMENTS

| | | | | |
|---|---|---|---|---|
| 4,108,363 A | * | 8/1978 | Susumu ................... | G07F 7/00 177/245 |
| 2004/0267621 A1 | * | 12/2004 | Schuller ............. | G01G 19/4144 705/23 |
| 2005/0269366 A1 | * | 12/2005 | Brundick ................... | A47F 1/03 222/185.1 |
| 2012/0029690 A1 | * | 2/2012 | Bruck ...................... | G07F 9/10 700/232 |
| 2012/0253509 A1 | * | 10/2012 | Garda ................. | G06F 19/3462 700/235 |

* cited by examiner

*Primary Examiner* — Timothy R Waggoner
(74) *Attorney, Agent, or Firm* — Lempia Summerfield Katz LLC (57) ABSTRACT

A bulk food weighing and processing system wherein a digital scale is uniquely configured and positioned to weigh and process individual portions of bulk food, uniquely designed and positioned to fit into a bulk food dispensing system. The system then prints a uniquely shaped and treated sticky, digitally-coded thermal-paper receipt which is used to seal a customer's portable container. The sticky receipt then aids customer checkout by providing digitally coded data about the food portion.

In most embodiments, the digital scale is a strain gauge scale positioned between a gravity bin's hopper and its mounting bracket, such that it can detect and process a customer's individual food portion once dispensed. The food portion's weight measurement is then transmitted through a controller to a thermal printer which prints a digitally-coded "sticky bag tag" receipt, which both seals the customer's portable food container and which can be read at checkout to facilitate payment and inventory processes.

18 Claims, 10 Drawing Sheets

BULK FOOD INTEGRATED SCALE SYSTEM

FIELD OF THE DISCLOSURE

The present invention relates to the field of bulk food dispensers and weight scale and printout systems for bulk foods and sundries, and consumer interface systems to facilitate efficient bulk food selection, measurement and purchasing.

BACKGROUND

This invention relates to an innovative integrated System for dispensing, weighing, identifying, processing and printing UPC/SKU/QR Code Bar Code or RFID-tag identifiers; said system also functions as a hub for bulk food product pre-checkout functions.

With consumers seeking to be environmentally-friendly, bulk foods are arguably the number one emerging consumer trend in the grocery industry. Some advantages of bulk food sections in grocery stores (i.e. unpackaged food in bulk bins) are, inter alia:

- A consumer can purchase precisely the amount of food they desire;
- Bulk foods are 25% cheaper on average than packaged counterparts;
- Bulk foods carry 40%-50% profit margins. The current drawback to bulk food dispensing, even in the most modern grocery stores, is that a bulk food customer must usually:
  - grab a plastic bag from a roll;
  - place the bag beneath a gravity-bin or next to a scoop-style dispenser;
  - pull the dispenser lever or turn the dispenser crank or screw;
  - walk with her bag to a weigh-station, usually comprising an old-fashioned analog baker's scale;
  - write the product name and weight on a sticker-label or twist-tie with a felt pen;
  - stick the sticker-label on the plastic bag;
  - use an old-fashioned twist-tie to close and secure the bag;
  - walk to the checkout line with the bag;
  - the grocery checkout clerk must then re-weigh the bag and manually input the item's unit price and item number
  - grocery checkout clerk must then generate yet another receipt.

What is needed, therefore, is a System that modernizes and integrates these functions in a unique way that technologically solves these issues, so the customer can select a desired amount of his/her product, and the System handles most of the remaining processing and checkout functions automatically. The instant invention solves these problems via its Bulk Food Integrated Scale System.

The instant System solves the current slow, cumbersome bulk food preparation process by, inter alia, positioning a digital scale underneath, behind, adjacent to, or into the gravity bin's bracket, then transmitting the item's weight to a centralized processor and then to a thermal printer which prints a UPC/SKU/QR Code bar code receipt onto a "luggage bag tag"-style sticky label, which can optionally be used in lieu of a traditional twist-tie to seal the customer's bag.

Based on the invention's "integrated scale" data, information about the bulk food item, price, and weight are automatically measured, transmitted and printed onto an adhesive thermal paper stock which is automatically dispensed at the system's "hub," or central kiosk area, where the consumer can look at a monitor display to verify the item, weight and price, and then grab the adhesive strip and use the strip to seal the bag. The hub can alternatively apply the sticky bag tag in an automated fashion via robotic arm or actuator.

Through these System steps, bulk food checkout more efficient for the consumer and for the store clerk, as the items are ultimately scanned like any other "factory packaged" item in the store. For oddly-shaped bulk foods or for liquid sundries like shampoo or oils or sauces, the receipt strip may also comprise a RFID Chip to aid the end-point laser scanner in checkout. Such optional chips solve potential problems of poorly printed, obscured, crumpled or damaged bar codes on the strip.

SUMMARY

A bulk food weighing and processing system wherein a digital scale is uniquely configured and positioned to weigh and process individual portions of bulk food, uniquely designed and positioned to fit into a bulk food dispensing system; the system then prints a uniquely shaped and treated sticky, digitally-coded thermal-paper receipt which seals a customer's portable container and then aids customer checkout by providing digitally coded data about the food portion.

BRIEF DESCRIPTION OF THE DRAWINGS

The drawings described herein are for illustrative purposes only and illustrate only selected embodiments of the present invention. The enclosed drawings are not intended to limit the scope of the present disclosure.

DEFINITIONS

Actuator: component of the dispenser which responds to a control signal from the hub processor to open/close the dispenser chute.

Bulk Food Dispenser: The food delivery component of the System. Examples are gravity bin dispensers, scoop bins, inversion bins, "loss-in-weight" gravimetric feeders, volumetric feeders, or any bulk food delivery mechanism appropriate for the instant System.

Chute: The spout section of the gravity bin dispenser.

Controller: computer hardware which interfaces with a peripheral device; said hardware manages the operation of (and connection with) the peripheral device(s).

Customer Display: An electronic display, such as Liquid Crystal Display ("LCD") or any other method of displaying a "real-time" read-out of the amount of bulk food product dispensed from the dispenser's chute/spout. In most embodiments of the instant System, the customer display is located substantially adjacent to each dispenser. This customer display is to be distinguished from the central hub processor's touchscreen interface display.

Dead End: electrical circuit's ground.

Digital Code: a machine-readable representation of data.

Hopper: The replaceable/cleanable part of the gravity dispenser that contains the food.

Hub Processor: The System's central processing unit. In most embodiments, the "hub" also comprises the touchscreen interface display, and a thermal printer. The hub processor is usually located at a central kiosk. The hub processor may also be positioned in the bracketed slot for a bulk bin dispenser. In most aspects, the Hub functions as the System's central customer touchscreen and printout station.

Load Cell: type of digital scale, in which a transducer is used to create an electrical signal whose magnitude is directly proportional to the force (herein weight) being measured. The force is typically loaded onto a top plate, which is often mounted above a base plate, with a spacer plate, or "spacer," positioned between the load cell and the base.

Mechanical Container Sealer: a machine used to seal packaging products, usually using heat.

Optical Reader: electronic device that can read and output printed barcodes to a computer. It contains decoder circuitry analyzing the barcode (or QR Code)'s image data provided by the sensor and sending the barcode's content to the scanner's output port. Common bar code readers, and even smartphones with cameras, can act as optical readers.

Payment Account: method by which customer pays merchant, usually a credit card, but can also be an online customer account processed through a server, such as an online account, an Amazon™ account or a Venmo™ account.

Pressure Plate: Digital scale comprising a weighing means for weighing articles, and means responsive to said weighing means for generating and coupling an electronic signal signifying weight. For purposes of this application, "load cell" and "strain gauge scale" are functionally interchangeable.

Quick Response Code, or "QR Code": matrix barcode, machine-readable [by an imaging device, herein supplied at checkout] optical label containing information about the item to which it is attached, used for item tracking identification checkout and marketing.

Receipt: The system's printed checkout means (usually UPC/SKU/QR Code or RFID tag or other optical scanning identifier) for checkout. In the preferred embodiment of the instant System, the receipt is printed on/as the "bag tag," rather than forcing the customer to use an old fashioned twist tie. In an "Amazon Go™"-type system, for example of alternative embodiment, the receipt would consequently be an unnecessary element of the System.

RFID Tag: a chip identifier attached to an object, said identifier contains electronically stored information which an RFID reader's interrogating radio waves collect and interpret to provide automatic identification and data capture about the item, herein including weight unit price and total price.

Scale: herein interchangeable with common digital scale, strain gauge scale, digital load cell, pressure plate, or hanging spring scale: any digital weight scale that can electronically transmit the weight of the customer's selected-bulk-food-portion to the System's hub processor and display(s). Digital spring scales, strain gauge scales, hanging spring or digital load cells, or any electronic scale that can be integrated into the instant System in the positions enumerated infra may be used.

Stock Keeping Unit, or "SKU" Bar Code: Similar to UPC bar code, but distinct for inventory management and other entity tracking methods.

Thermal Paper: a special fine paper coated with a chemical that changes color when exposed to heat, said paper used in common cash registers and credit card terminals, and herein used as a key component in the customer's "sticky bag tag" receipt.

Thermal Printer: a small printer in which small heated pins form characters on heat-sensitive paper.

Touchscreen Interface: The touch-screen user input/output device. In most embodiments, the interface display is positioned at the System's hub processor.

Universal Product Code, or "UPC" Bar Code: machine-readable representation of data useful for supermarket, or other checkout systems by using automatic identification and data capture.

Volumetric Feeder: Bulk food dispenser that measures the amount of dispensed product by measuring flow rate and multiplying by length of dispensation. Volumetric feeders, which do not use "weight scales," are primarily for liquids and other items not usually found in gravity bins. These feeders use the above "flow rate measuring method," which is compatible with the instant System.

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)

(a second number)," this means a range whose limit is the second number. For example, 25 to 100 mm means a range whose lower limit is 25 mm and upper limit is 100 mm. Aspects of the disclosed invention may be embodied as a system, method or process, or computer program product. Accordingly, aspects of the disclosed invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any element in a claim that does not explicitly state "means for" performing a specified function, or "step for" performing a specific function is not to be interpreted as a "means" or "step" clause as specified in 35. U.S.C. § 112, r 6. Specifically, the use of "step of" in the claims herein is not intended to invoke the provisions of U.S.C. § 112, paragraph 6.

Figure 1A:
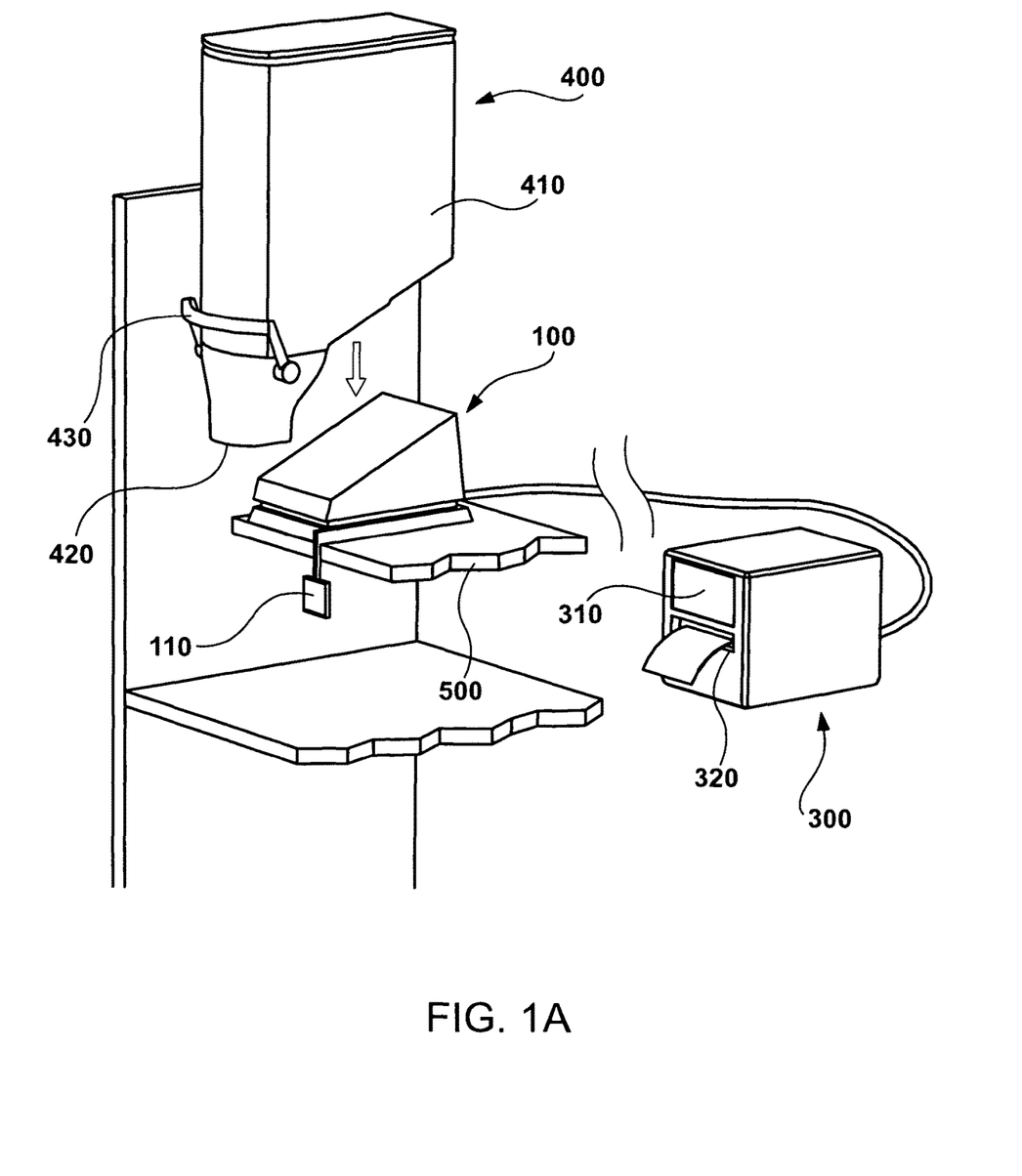
FIG. 1A is an angled side view of the exterior of the bulk food dispenser with one embodiment of the integrated scale (herein as a pressure plate scale base, herein shown separated from the gravity bin hopper) and front-facing LCD or other electronic visual display monitor, and the central printing and user-interface station ("pre-checkout" station), generating a sticker-label with SKU/UPC/QR Bar Code and/or RFID Tag.

FIG. 1A depicts a simplified embodiment of the invention. The integrated scale 100, a digital strain gauge scale or load cell or "pressure plate," is positioned below a bulk food bin dispenser 400 hopper bin 410. The scale is uniquely designed to fit underneath the hopper of the gravity bin. In this illustrated embodiment, all the System's physical components rest on a shelf 500. The integrated scale 100 functions as a digital scale, calibrated to measure changes in the weight of bulk food in the dispenser. When the customer pulls down the dispenser lever 430 and waits for the desired amount of food to fall through the valve in the chute 420, the integrated scale 100 senses the difference in weight and transmits this data to a central hub processor 300, which processes the weight difference. The hub processor 300 then sends this information back to the customer's label-display as a readout on an electronic visual display 110, e.g. a LCD monitor. Alternatively, the processor can query the scale 100 at a set time interval, and the scale 100 will send a transaction report to the hub processor 300's touchscreen user interface and printer 320.

The hub processor 300 can alternatively be connected to any number of dispensers, printers and user interfaces, either locally or remotely. Alternatively, the display 110 can be shown as any display or label substantially near the dispenser 400. The dispensed-food's weight is also transmitted to the printer 320, which generates a receipt or transaction report with a barcode and product information and indicates the important receipt information on its 300 touchscreen interface display 310. Receipt information may contain the dispenser bin number (not shown), the type of bulk food product (e.g. coffee beans, rice, granola, etc.), the unit price, the portion weight, the item's total price, and other receipt identifiers programmed by the grocer into the hub processor 300 during initial formatting and set-up. The hub processor 300 may also be accessed to research prior transactions. Errors may be fixed via the touchscreen interface 310. The System's preferred embodiment for the printer's 320 receipt is a sticky Bar Coded Bag Tag, in the same fashion as airline luggage bag tags, sealing the customer's receptacle bag in addition to functioning as an identifier. New, or replacement receipts (bar coded sticky bag tags) can be generated at the customer's behest.

The scale 100 and hub processor 300, display 310 and printer 320 are "integrateable," in that these aspects of the system may be infused into existing, non-automated bulk food dispensing systems in order to modernize them.

Figure 1B:
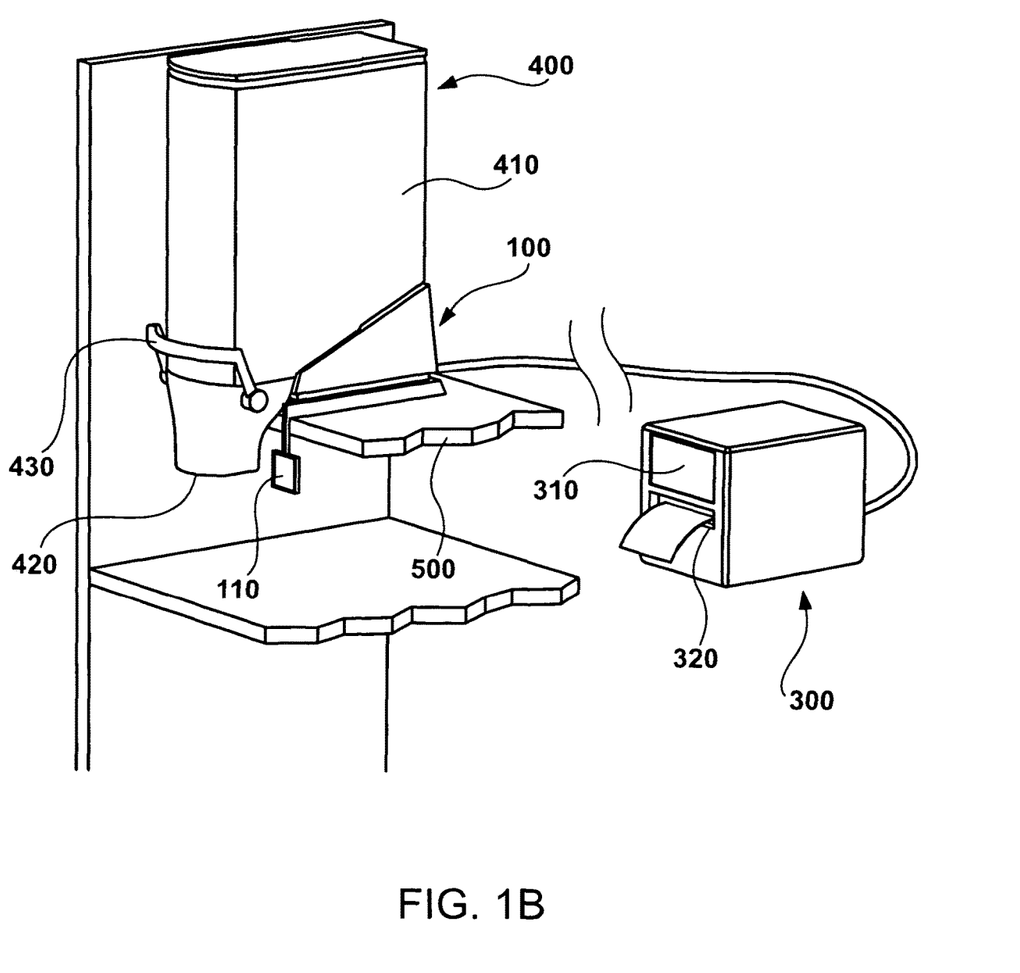
FIG. 1B is an angled side view of the bulk food dispenser comprising the electronic visual display monitor, with the integrated scale underneath (herein shown assembled); the integrated scale connected to the SKU/UPC/QR Bar Code printing unit (herein shown without touchscreen).

FIG. 1B is the same "stripped-down" embodiment of the System as that in FIG. 1A, herein shown with the hopper 410 resting on the scale 100 as it would be positioned when installed.

Figure 2:
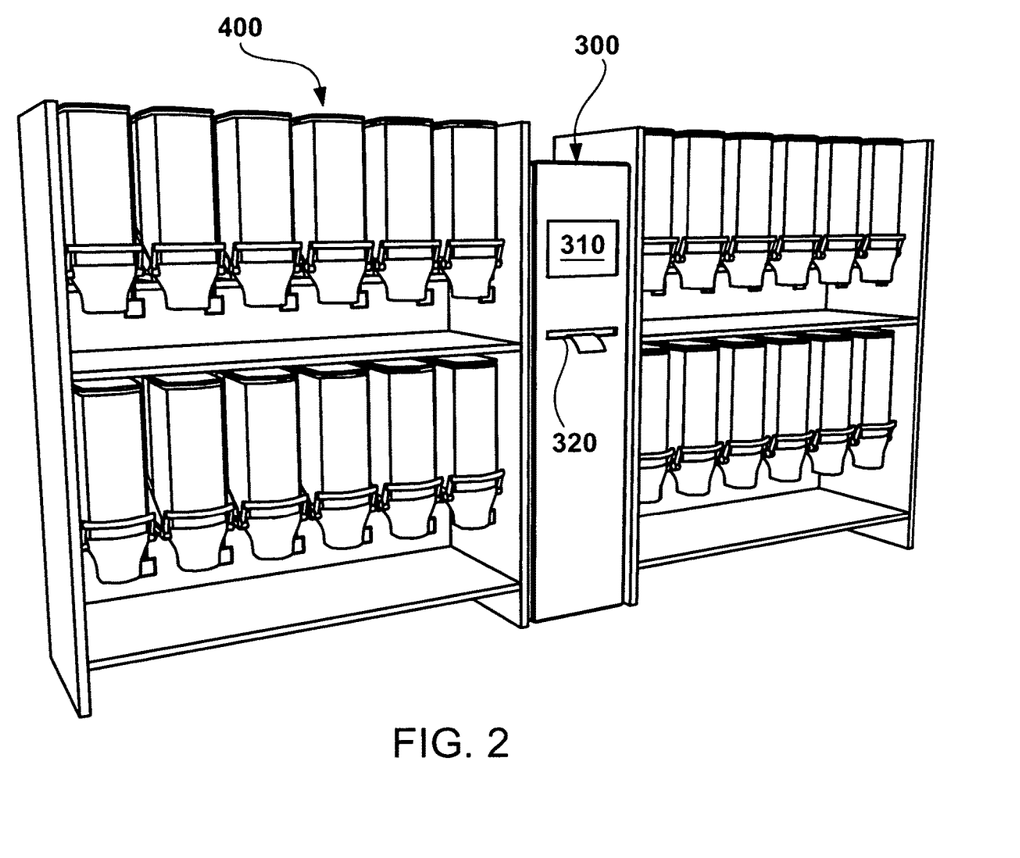
FIG. 2 is an angled front view of a bank, or two-tiered tower, of two rows of bulk food dispensers in a rack-tower layout, with the central customer touchscreen and printout station in the middle of the dispenser rows. The scale, integrated into each individual dispenser, can be integrated into the chute component, either below the drum or compartment-valve, or may be mounted as a hanging spring-scale or digital load cell beneath each dispenser.

FIG. 2 is an angled view of the front of a bank layout of two rows of bulk food dispensers, with the central customer touchscreen and printout station (including the hub processor 300) positioned in the middle of the dispenser rows as a central kiosk in the embodiment shown. In alternative embodiments, the scale can be integrated into the dispenser chute 410, either below the drum or screw or compartment-valve. The scale may alternatively be mounted as a hanging spring-scale or digital load cell beneath. Here, each gravity bin 400 utilizes a scale attached to/integrated with its rear bracket mount to measure the change in weight associated with a customer's purchase (these "bracket-scales" are featured in FIGS. 3-5, infra). The scale then electronically transmits the digital data (re: food portion weight, unit price, etc.) to the hub processor 300, which then processes, stores and transmits receipt info to the printer 320 and the user touchscreen interface 310.

Figure 3A:
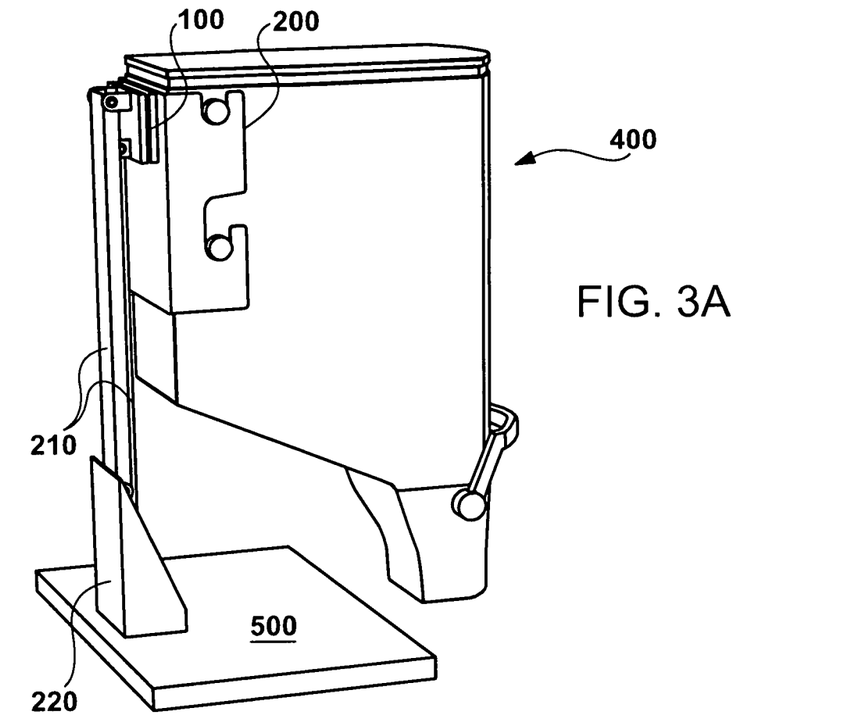
FIG. 3A is a side-rear view of the dispenser and scale components of the System. In this embodiment, the integrated scale is mounted behind the gravity dispenser bracket's connecting piece, with the bracket arms in upright position.

FIG. 3A depicts the System wherein the scale 100 is a strain gauge scale 100 integrated into the bin's 400 mounting bracket 200. The gravity bin 400 is attached to a bracket 200, which is attached to the strain gauge scale 100, which measures strains on its internal beams to process weight changes. In this embodiment, the strain gauge scale 130 senses the change in compression at its front-side beam, digitally processing this information into a "change in weight Delta," then transmitting this information to the System's hub processor 300.

The dispenser bracket arms 210 can be extended forward for easy access to the bin. The unit shown has a molded base stand 220. In alternative embodiments, the molded base stand 220 can also comprise the scale 100. In the embodiment shown, these working components rest on a base shelf 500, which also can comprise the scale 100.

Figure 3B:
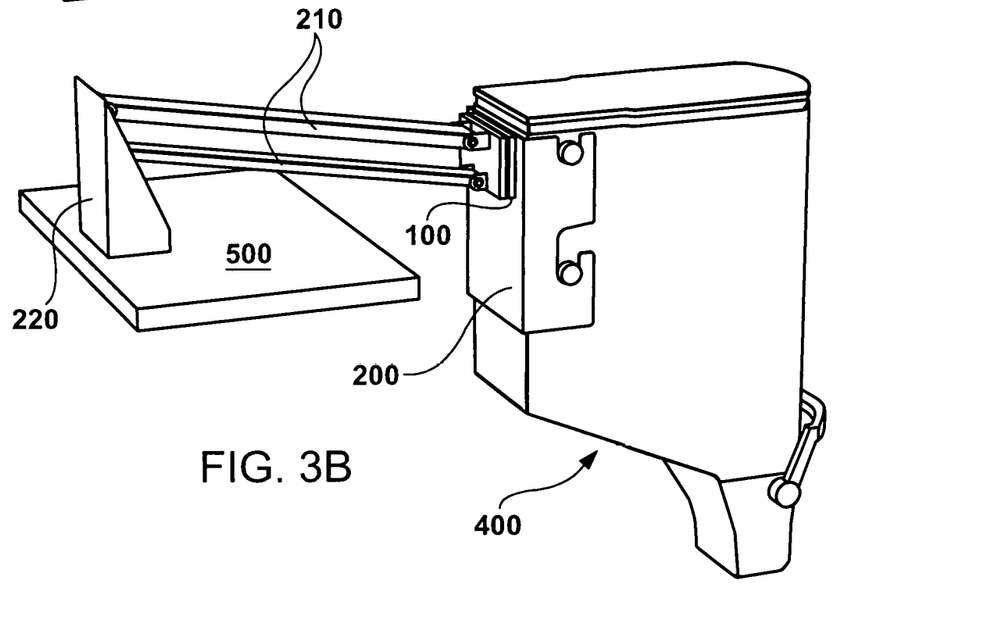
FIG. 3B is a side view of the dispenser and scale components of the System. In this embodiment, the integrated scale is mounted behind the dispenser bracket's connecting piece, with the bracket arms in a substantially horizontal, outstretched position.

FIG. 3B illustrates the bracket-scale components of the System with the bracket arms 210 positioned forward.

Figure 4A:
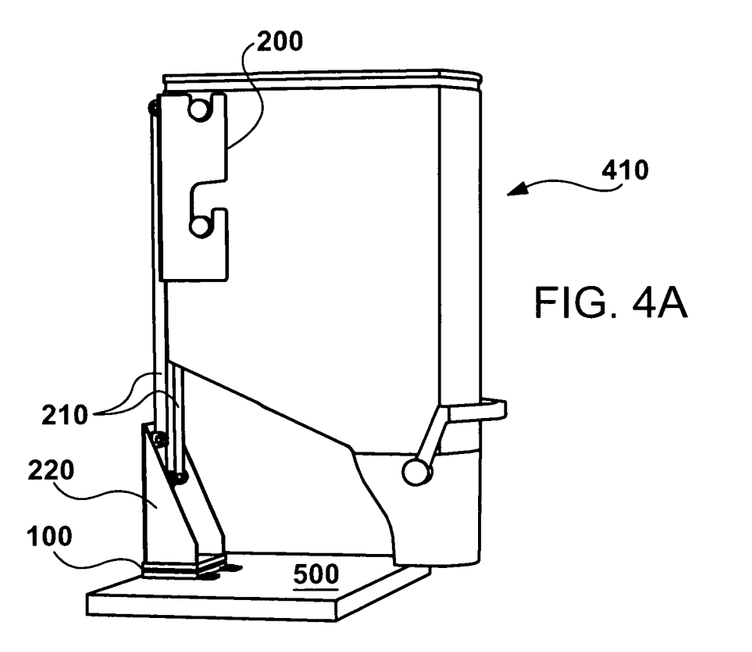
FIG. 4A is an angled-side view of the dispenser and scale components of the System. In this embodiment, the integrated scale is positioned underneath the dispenser bracket's base-stand, with the bracket arms in upright position. The integrated scale shown herein is a digital load cell, otherwise known as a "pressure plate" scale.

FIG. 4A illustrates the an embodiment of the System wherein the integrated scale 100 is a pressure plate scale positioned underneath the bracket base 220. The bin hopper's 410 notches, or bolts, rest on the mounting bracket 200. In this embodiment, the integrated scale 100 is positioned underneath the base stand 220 between the shelf 500 and the base stand 220. The bracket arms 210 remain in a substantially vertical position, parallel with a wall or rack behind the gravity bin hopper 410.

Figure 4B:
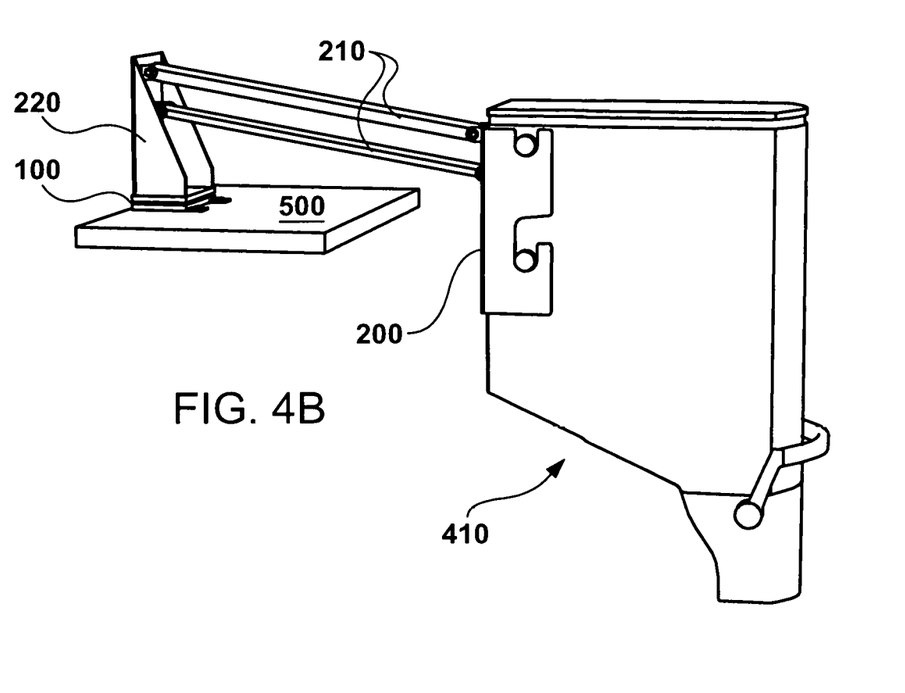
FIG. 4B is an angled-side view of the dispenser and scale components of the System. In this embodiment, the integrated scale is positioned underneath the dispenser bracket's base-stand, with the bracket arms in a substantially horizontal-outstretched position. The scale shown is a digital load cell, otherwise known as a "pressure plate" scale.
Figures 5A, 5B:
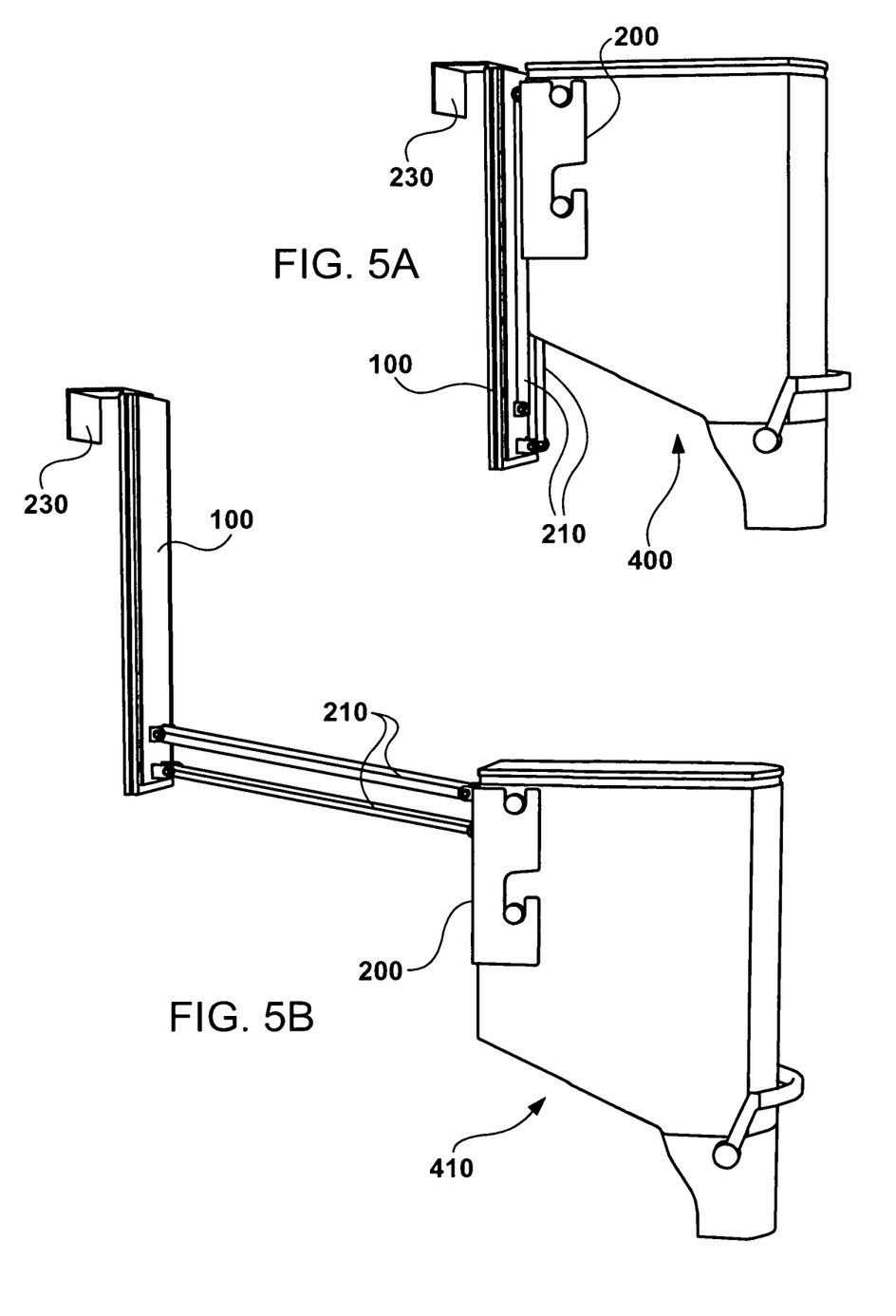
FIG. 5A is a side view of the dispenser and scale components of the System in an embodiment in which the integrated scale is mounted between the bracket arms and the wall, door or rack-tower via "over the door" hook, with the bracket arms in upright position.
FIG. 5B is a side view of the dispenser and scale components of the System in the embodiment in which the integrated scale is mounted between the bracket arms and the wall, door or rack-tower via "over the door" hook, with the bracket arms in a substantially horizontal, outstretched position.

FIG. 4B illustrates the same embodiment as that shown in FIG. 4A, with its bracket arms 210 positioned forward, toward the customer for easy food dispensing. FIG. 5A illustrates an embodiment of the System wherein the scale 100 is integrated, or built into the wall-plate section of the bracket 200. The bracket 200 and scale 100 are then mounted to a wall, rack or display tower via an "over the door" hook 230.

FIG. 5B illustrates the same embodiment as that shown in FIG. 5A, with its bracket arms 210 positioned forward for easy customer food dispensing.

Figure 6A:
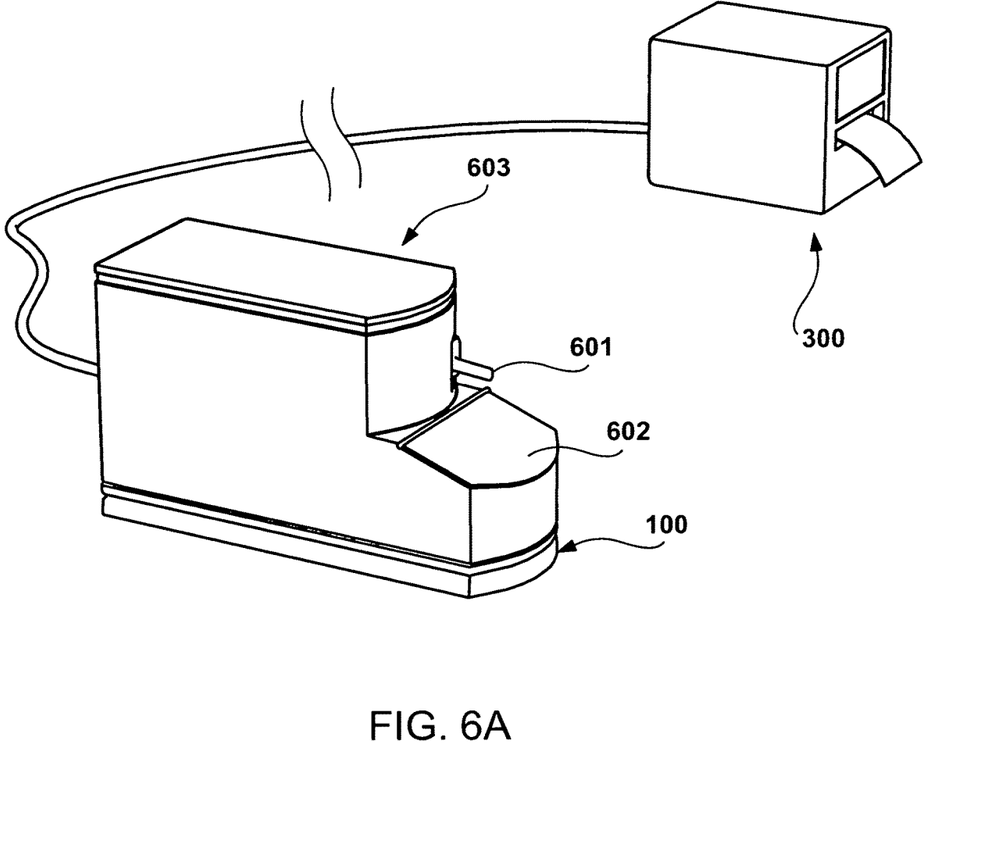
FIG. 6A is an angled-side view of one embodiment of the System in which a "scoop bin" is featured, rather than a gravity bin. The pressure plate integrated scale is herein positioned underneath the scoop bin.

FIG. 6A shows the System with a Scoop Bin rather than a gravity bin. Here, a pressure plate scale 100 serves as the System's integrated scale 100. The shovel-type scoop 601, or tongs, rest in a scoop holder. The scoop bin has a door 602 which the customer opens to scoop out their desired bulk food portion. The grocer refills the bin via the lid 603. The scale 100 shown herein is a pressure plate scale 100 positioned under the scoop bin, or alternatively built into the base of the scoop bin. The System transmits weight and identifying information to the hub processor 300 as in other embodiments.

Figure 7:
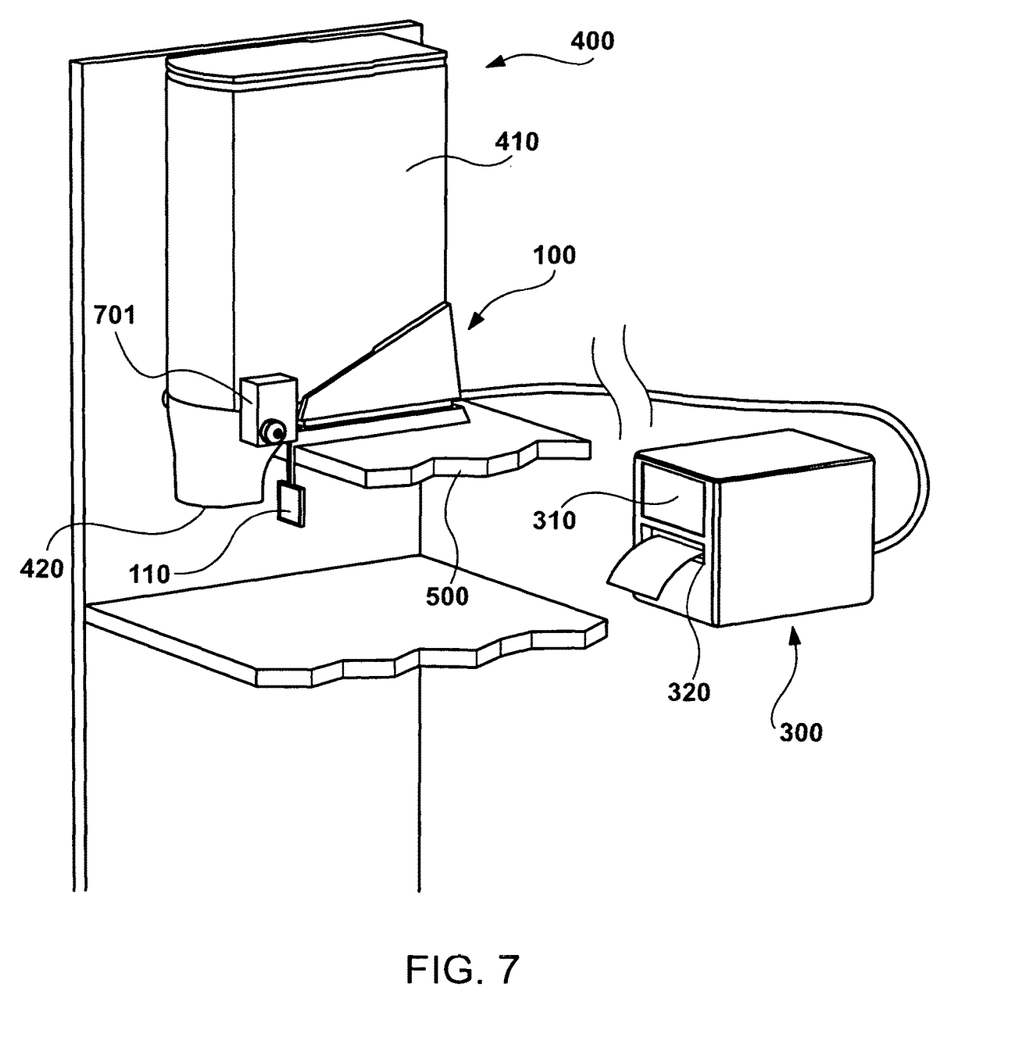
FIG. 7 is an angled-side view of an embodiment of the System in which the customer's portion of bulk food may be dispensed automatically, without the customer using a hand-lever. In the embodiment shown, a common valve-actuator replaces the hand-crank/hand-lever component of the dispenser. In this embodiment, the actuator box and internal actuator axle (not shown) open the dispenser chute's valve.

FIG. 7 illustrates a "Smart Dispenser" embodiment of the System in which the customer's portion of bulk food is dispensed automatically, without the customer needing to use a hand-lever or crank 430 (not shown). In the embodiment shown, an actuator 701 replaces the hand-lever component of the dispenser. In this embodiment, when the customer inputs their desired portion into the touchscreen interface 310, the hub processor 300 prompts the actuator 701 box to rotate the internal actuator axle (not shown) to open the dispenser chute's 420 valve.

In this embodiment, the customer chooses the product and desired portion via the touchscreen interface 310, and the bulk food comes out of the chute 420 into the customer's bag. In an alternative embodiment, a bank of hoppers (similar to FIG. 2) each may feed into the same chute 420, eliminating the need for a wall, or bank of chutes 420. Alternative "fully-automated" Systems feature a keypad next to each "Smart Dispenser," and the dispenser measures portions by flow-rate or change-in-volume (volumetric feeders), thereby dispensing the customer's desired portion.

Figure 8:
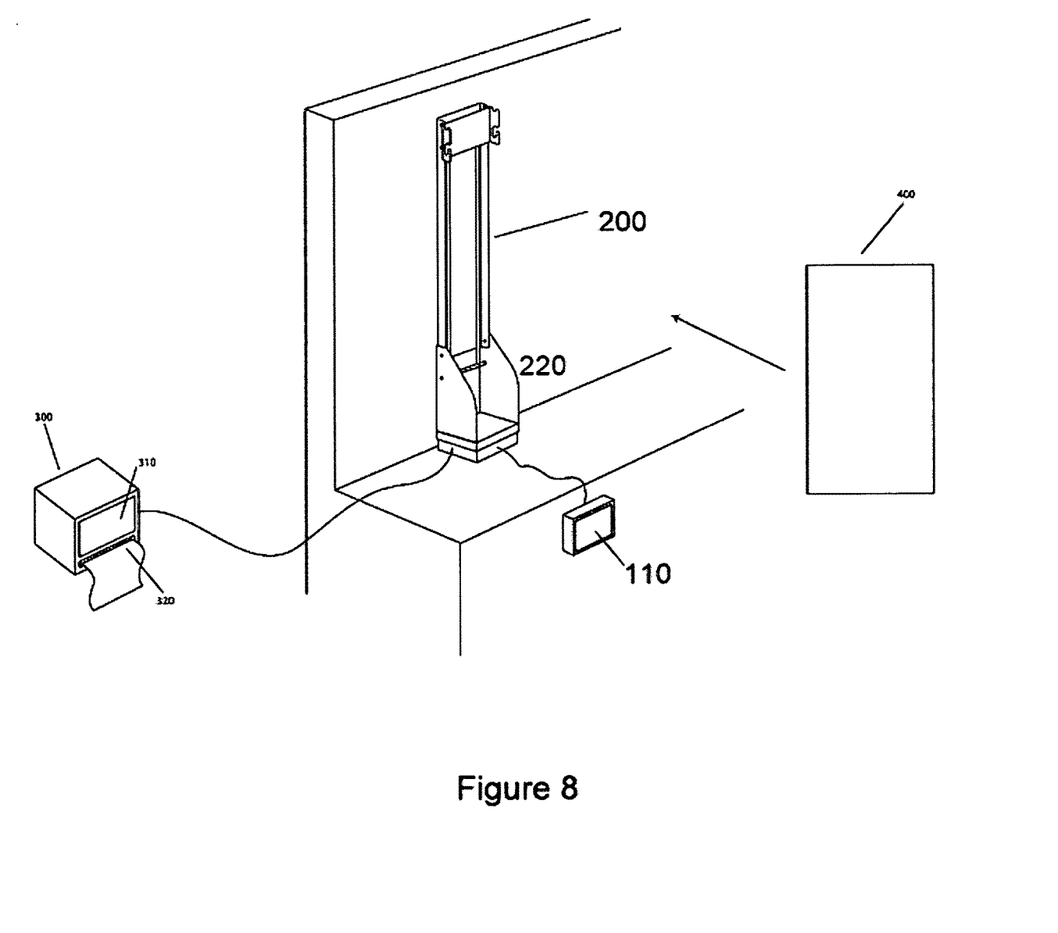
FIG. 8 is a landscape front view of the System. In the embodiment shown, the integrated scale is positioned underneath the dispenser's bracket base. In the embodiment shown, the bracket does not have hinged moveable arms, but rather the gravity dispenser fits into the wall bracket, which is fixed against a shelf, rack, tower or wall type fixture. In addition to the central LCD touchscreen display, the embodiment shown features an individual screen positioned in front of the scale and within the immediate purview of the customer, easily showing the customer the item, portion dispensed, price, and other indicators discussed infra.

FIG. 8 is a landscape front view of one embodiment of the System. In the embodiment shown, the integrated scale 100 is positioned underneath the dispenser's bracket base 220. In the embodiment shown, the bracket 200 does not have hinged moveable arms, but rather the gravity dispenser 400 (herein shown as "black box") fits into the wall bracket 200 by resting in the bracket's 200 top notches. The bracket 200 is fixed against a shelf, rack, tower or wall fixture. In addition to the central touchscreen interface 310 display, the embodiment shown features an individual display screen 110 positioned in front of the scale 100 and within the immediate purview of the customer, easily showing the customer the item, portion dispensed, unit price, price of portion, and other indicators discussed infra. In alternative embodiments, the individual screen 110 can be replaced by a label showing the same information, either in electronic, written and/or audible form.

Figure 9:
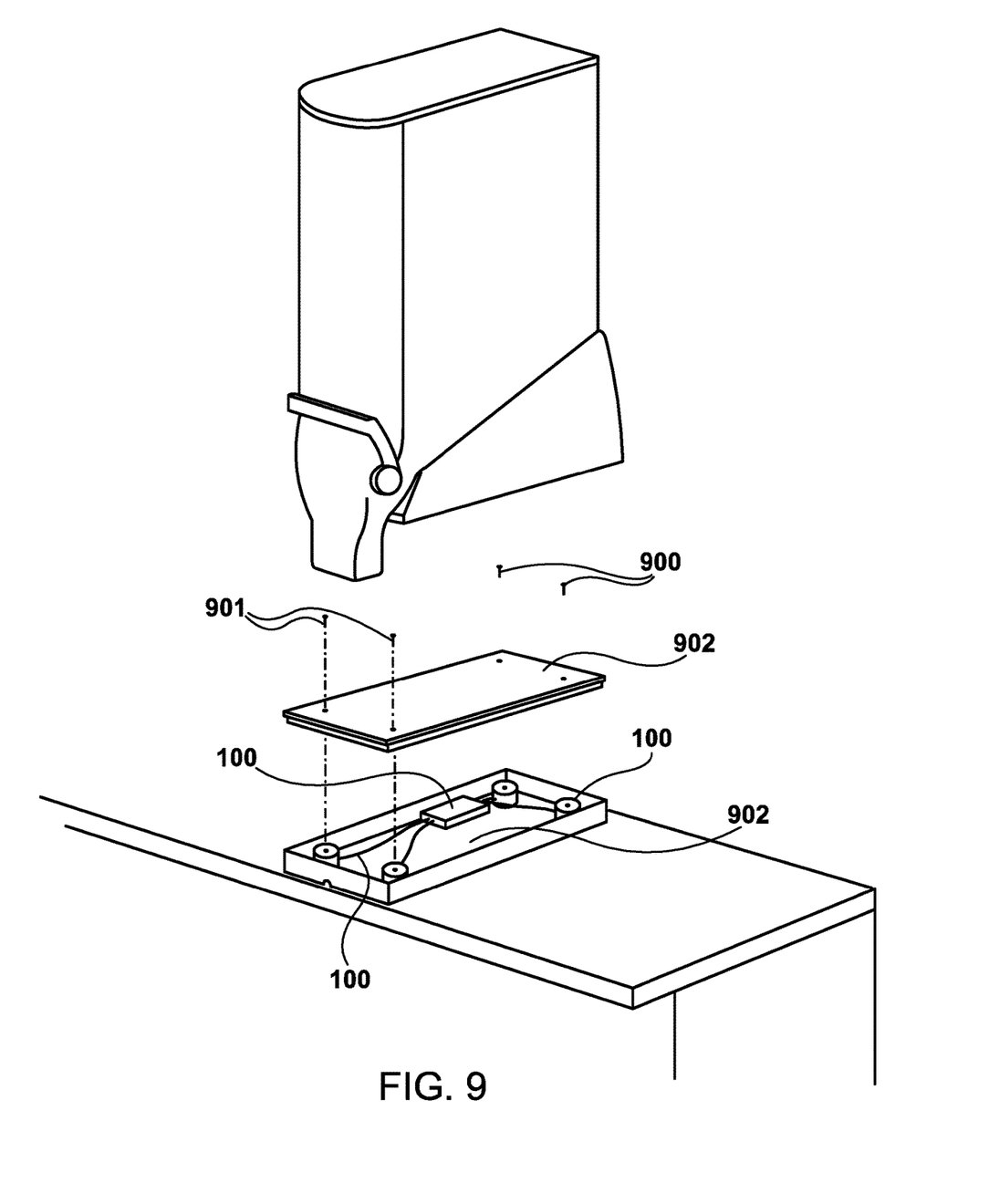
FIG. 9 is a landscape, exploded view of the pressure plate load cell integrated-scale in this embodiment of the System. In the embodiment shown, the positioning of various components digital load cell, or pressure plate, are shown (remainder of the hub processing and printing features not shown).

FIG. 9 is a landscape, exploded view of the System, this embodiment featuring a pressure plate load cell integrated scale 100. In the embodiment shown, the positioning of various components of the digital load cell 100, or "pressure plate," are shown. The remainder of the hub process[ing] 300 and printing 320 features not shown in FIG. 9.

In this sample embodiment, for illustration, installation of the integrated scale 100 System into a preexisting, bracketed gravity bulk food dispenser 400 proceeds as follows:
1. • drill adequate number of holes into shelf 500 or foundation;
2. • bolt 901 down a base plate 902 between foundation shelf 500 and scale 100;

3. • install integrated scale 100 (digital load cell, pressure plate) above the spacer 903 by untightening the spacer bolts, fitting the load cell (scale 100) above the spacer 903;
4. • screw the dead end of the load cell 100 into the horizontal base plate 902;
5. • proceed to retightening and aligning bolts 901; then
6. • connect and calibrate load cell 100 with processor 300 (not shown) for accurate weight detection, transmission, processing and display at label display 110 and central hub processor 300 LCD display (not shown).

Alternate Embodiments

1. The System of FIGS. 1-5B wherein the print[ed] 320 checkout receipt is an airport luggage-style "bag tag," which comprises bar-coded identifiers, yet remains sufficiently light and pliable to automatically tie and secure the customer's bag.

2. For liquids and other bulk items that do not dispense efficiently via gravity bins or bulk bin hoppers, e.g. shampoos and oils, the System comprising a volumetric feeder, measuring product weight via average flow rate or simple change-in-volume detector(s). The remainder of the System steps are substantially the same. For these liquid-variety items, the print[ed] 320 sticky receipt would either conform to liquid containers, or would transmit directly to checkout in a "check-out-less" fully-computerized automated store System.

3. The System comprising "Smart bin dispenser" which utilizes a "start and stop" function which identifies when the customer begins to use the dispenser and when the user has finished. One embodiment of this "Smart bin dispenser" System is featured in FIG. 7, featuring an actuator 701 in place of the hand crank 430.

A working variation of this embodiment covers "receipt-less" transactions in stores in which bar-code optical scanning and/or RFID-Tags digitally replace the checkout process, such as Amazon-Go™, type Systems. In such instances, the instant System works without the print[ing] 320 aspect of the hub processor 300. In place of a print[ed] 320 receipt, the bulk product identifiers (unit price, weight, total price and other useful information infra) are processed through the System's hub processor 300 into the store's Network-Checkout Application in the same way the System Application processes the store's digitally-labeled packaged-foods. The instant System's hub processor 300 may therefore be decentralized or linked via computer network Server. The central system can also be "credit-card-less," as in Amazon Go system or Venmo account system, wherein the customer account is processed through the Server.

4. The instant system wherein the Touchscreen Interface allows the customer and the store to process mistakes for re-dispensation and labeling.

5. The instant system wherein the controller fits into the space wherein a bulk-bin dispenser would be in a row, or rack, of such dispensers.

6. The instant system wherein the bin dispenser, or gravity bin, is a "smart bin," which allows the customer to choose their portion of food by punching their desired food portion directly onto the bin, which comprises a CNC (computer numerical control) or NC (numerical control) board directly on the bin.

The invention claimed is:

1. A bulk food weighing and processing system comprising:

a bulk bin food dispenser containing a food with a distinct weight;
a computer comprising a memory, a controller, and a touchscreen interface configured to show information related to the food in the bulk bin food dispenser;
a thermal printer configured to generate a thermal paper strip with a digital code, wherein the thermal paper strip is configured to seal a portable food container; and
a digital scale configured to measure a change in weight of the bulk bin food dispenser when a portion of the food is dispensed into the portable food container, and wherein the digital scale is configured to transmit the measured change in the weight to the controller,
wherein the controller is configured to automatically prompt the thermal printer to generate the digitally coded thermal paper strip indicating a dispensed weight of the portion of the food dispensed into the portable food container based on the measured change in the weight of the bulk bin food dispenser.

2. The system of claim 1, wherein the digital scale is a strain gauge scale configured to measure the change in the weight of the bulk bin food dispenser as the weight of the dispensed portion of the food.

3. The system of claim 1, wherein the bulk bin food dispenser is connected to a fixture by a bracket, and wherein the digital scale is positioned between the bracket and the fixture.

4. The system of claim 1, wherein the bulk bin food dispenser is connected to a fixture by a bracket, and wherein the bracket comprises the digital scale.

5. The system of claim 1, wherein the bulk bin food dispenser is connected to a fixture by a bracket, wherein the bracket comprises a bracket base, and wherein the digital scale is positioned underneath the bracket base.

6. The system of claim 1, wherein the bulk bin food dispenser is connected to a fixture by a bracket, wherein the bracket comprises mechanical arms, and wherein the mechanical arms comprise the digital scale.

7. The system of claim 1, wherein the digital code is a UPC bar code.

8. The system of claim 1, wherein the digital code is a SKU bar code.

9. The system of claim 1, wherein the digital code is a QR Code.

10. The system of claim 1, wherein the digitally coded paper strip comprises an RFID Tag.

11. The system of claim 1, wherein the thermal paper strip comprises a dry side and an adhesive side to seal said portable food container.

12. The system of claim 1, wherein the bulk bin food dispenser comprises a lever, and
wherein a customer is configured to dispense the portion of the food by pulling the lever.

13. The system of claim 1, wherein the bulk bin food dispenser comprises a crank, and wherein a customer is configured to dispense the portion of the food by turning the crank.

14. The system of claim 1, wherein food dispenser comprises an actuator triggered by the controller via the touchscreen interface, and wherein a customer is configured to select the portion of the food via the touchscreen interface.

15. The system of claim 1, wherein the touchscreen interface comprises a means for a customer to correct errors to re-dispense the portion of the food and to reprint the digitally coded thermal paper strip.

16. The system of claim 1, wherein the bulk bin food dispenser is a gravity bin comprising the controller, the touchscreen interface, and the thermal printer.

17. The system of claim 1, further comprising:
at least one optical reader configured to decipher the digital code of the thermal paper strip to ascertain the weight and cost of the portion of the dispensed food.

18. The system of claim 1, wherein the digitally coded thermal paper strip further provides an indication regarding a type of food that has been dispensed from the bulk bin food dispenser.

* * * * *